United States Patent
Terada

(10) Patent No.: US 11,481,344 B2
(45) Date of Patent: Oct. 25, 2022

(54) INSTRUCTION CONVERSION DEVICE, METHOD, AND PROGRAM

(71) Applicant: Mitsubishi Electric Corporation, Tokyo (JP)

(72) Inventor: Yurika Terada, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/604,758

(22) PCT Filed: Jun. 19, 2019

(86) PCT No.: PCT/JP2019/024370
§ 371 (c)(1),
(2) Date: Oct. 19, 2021

(87) PCT Pub. No.: WO2020/255309
PCT Pub. Date: Dec. 24, 2020

(65) Prior Publication Data
US 2022/0147473 A1 May 12, 2022

(51) Int. Cl.
*G06F 13/16* (2006.01)
*G06F 13/38* (2006.01)
(Continued)

(52) U.S. Cl.
CPC ...... *G06F 13/1684* (2013.01); *G06F 9/30181* (2013.01); *G06F 13/387* (2013.01); *G06F 13/4004* (2013.01); *G06F 2213/0024* (2013.01)

(58) Field of Classification Search
None
See application file for complete search history.

(56) References Cited

U.S. PATENT DOCUMENTS 6,370,603 B1 * 4/2002 Silverman ............. G06F 13/385
710/63
6,571,308 B1 * 5/2003 Reiss .................. G06F 13/4027
710/303
(Continued)

FOREIGN PATENT DOCUMENTS

CN 102325128 A * 1/2012
CN 102325128 A 1/2012
(Continued)

OTHER PUBLICATIONS

'Types of I/O Buses' from anwarbari.tripod.com archived on Sep. 8, 2019. (Year: 2019).*
(Continued)

*Primary Examiner* — Steven G Snyder
(74) *Attorney, Agent, or Firm* — Xsensus LLP

(57) ABSTRACT

A CPU module (100) includes a first bus complying with a first communication protocol, and a second bus complying with a second communication protocol different from the first communication protocol. A conversion setting storage (110) included in the CPU module (100) stores information indicating association between a general instruction complying with the first communication protocol and a dedicated instruction complying with the second communication protocol. A protocol converter (160) included in the CPU module (100) acquires, when the general instruction is output by instruction output means to a device connected via the second bus, the dedicated instruction associated with the general instruction from the conversion setting storage (110) and provides the acquired dedicated instruction to the device via the second bus.

10 Claims, 8 Drawing Sheets

(51) Int. Cl.
  *G06F 9/30* (2018.01)
  *G06F 13/40* (2006.01)

(56) References Cited

U.S. PATENT DOCUMENTS

| | | | | |
|---|---|---|---|---|
| 6,925,519 | B2* | 8/2005 | Day | G06F 3/0607 |
| | | | | 710/315 |
| 7,246,191 | B2* | 7/2007 | Stanton | G06F 13/4027 |
| | | | | 710/52 |
| 7,913,025 | B1* | 3/2011 | Chamseddine | G06F 3/0683 |
| | | | | 710/310 |
| 9,342,629 | B2* | 5/2016 | Zhang | G06F 13/4221 |
| 10,713,207 | B2* | 7/2020 | Payment | G06F 1/10 |
| 2002/0069245 | A1* | 6/2002 | Kim | G06F 13/387 |
| | | | | 719/321 |
| 2003/0067934 | A1* | 4/2003 | Hooper | H04L 49/9057 |
| | | | | 370/428 |
| 2004/0019734 | A1* | 1/2004 | Day | G06F 3/0689 |
| | | | | 710/315 |
| 2007/0162679 | A1* | 7/2007 | Wang | G06F 13/4027 |
| | | | | 710/315 |
| 2008/0244099 | A1 | 10/2008 | Machida | |
| 2011/0078349 | A1 | 3/2011 | Ushigami | |
| 2015/0242535 | A1* | 8/2015 | Zhang | G06F 16/90339 |
| | | | | 710/313 |
| 2020/0004718 | A1* | 1/2020 | Payment | G06F 13/4282 |
| 2020/0341935 | A1* | 10/2020 | Payment | G06F 1/10 |
| 2020/0401542 | A1* | 12/2020 | Li | G06F 13/38 |

FOREIGN PATENT DOCUMENTS

| | | | | |
|---|---|---|---|---|
| CN | 103034602 | A * | 4/2013 | G06F 12/12 |
| CN | 106201947 | A * | 12/2016 | G06F 13/385 |
| JP | 2000-341357 | A | 12/2000 | |
| JP | 2001-306399 | A | 11/2001 | |
| JP | 2005-275452 | A | 10/2005 | |
| JP | 2006-4095 | A | 1/2006 | |
| JP | 2010-49543 | A | 3/2010 | |
| JP | 2011-70546 | A | 4/2011 | |

OTHER PUBLICATIONS

International Search Report and Written Opinion dated Jul. 30, 2019, received for PCT Application PCT/JP2019/024370, Filed on Jun. 19, 2019, 9 pages including English Translation.

Decision to Grant dated Jul. 7, 2020, received for JP Application 2020-517408, 5 pages including English Translation.

Office Action dated Jul. 15, 2022, in corresponding Chinese patent Application No. 201980097506.X, 20 pages.

* cited by examiner

FIG.3

CONVERSION TABLE 110a

| DEVICE NAME | DEVICE TYPE | CONNECTED BUS TYPE | BUS WIDTH | DEDICATED INSTRUCTION | GENERAL INSTRUCTION | ACTUAL RETURN VALUE | EXPECTED RETURN VALUE |
|---|---|---|---|---|---|---|---|
| INPUT UNIT 200 | I/O UNIT | DEDICATED BUS 410 | 64bit | DEDICATED INSTRUCTION A | GENERAL INSTRUCTION A | NONE | TRUE |
| OUTPUT UNIT 300 | I/O UNIT | DEDICATED BUS 410 | 64bit | DEDICATED INSTRUCTION B | GENERAL INSTRUCTION B | XXX | TRUE |
| DEVICE 21 | NETWORK ADAPTER | GENERAL BUS 701 | 32bit | - | - | - | - |
| DEVICE 22 | DISPLAY ADAPTER | GENERAL BUS 701 | 32bit | - | - | - | - |
| ... | ... | ... | ... | ... | ... | ... | ... |

FIG.4

DEVICE CONFIGURATION TABLE 120a

| DEVICE NAME | DEVICE TYPE | CONNECTED BUS TYPE | MEMORY ADDRESS IN ADDRESS SPACE IN PCI | POSITION INFORMATION (BUS NUMBER; DEVICE NUMBER; FUNCTION NUMBER) | PHYSICAL ADDRESS OF DEVICE REGISTER |
|---|---|---|---|---|---|
| INPUT UNIT 200 | I/O UNIT | DEDICATED BUS 410 | xxx | 1:2:5 | xxx |
| OUTPUT UNIT 300 | I/O UNIT | DEDICATED BUS 410 | xxx | 1:3:4 | xxx |
| DEVICE 21 | NETWORK ADAPTER | GENERAL BUS 701 | xxx | 1:2:2 | xxx |
| DEVICE 22 | DISPLAY ADAPTER | GENERAL BUS 701 | xxx | 1:3:1 | xxx |
| ... | ... | ... | ... | ... | ... |

FIG.5

MEMORY MAPPING TABLE 130a

| DEVICE NAME | ACTUAL START ADDRESS | ACTUAL SIZE | MEMORY ADDRESS IN ADDRESS SPACE IN PCI | CONNECTED BUS TYPE |
|---|---|---|---|---|
| INPUT UNIT 200 | 0X0000 | 0X1000 | XXX | DEDICATED BUS |
| OUTPUT UNIT 300 | 0XZZZZ | 0X1000 | XXX | DEDICATED BUS |
| ... | ... | ... | ... | ... |

FIG.6

DEVICE CONFIGURATION TABLE 120a

| DEVICE NAME | DEVICE TYPE | CONNECTED BUS TYPE | MEMORY ADDRESS IN ADDRESS SPACE IN PCI | POSITION INFORMATION (BUS NUMBER; DEVICE NUMBER; FUNCTION NUMBER) | PHYSICAL ADDRESS OF DEVICE REGISTER |
|---|---|---|---|---|---|
| INPUT UNIT 200 | I/O UNIT | DEDICATED BUS 410 | UNAVAILABLE | NONE | NONE |
| OUTPUT UNIT 300 | I/O UNIT | DEDICATED BUS 410 | UNAVAILABLE | NONE | NONE |
| DEVICE 21 | NETWORK ADAPTER | GENERAL BUS 701 | XXX | 1:2:2 | XXX |
| DEVICE 22 | DISPLAY ADAPTER | GENERAL BUS 701 | XXX | 1:3:1 | XXX |
| ... | ... | ... | ... | ... | ... |

INSTRUCTION CONVERSION DEVICE, METHOD, AND PROGRAM

CROSS-REFERENCE TO RELATED APPLICATION

The present application is based on PCT filing PCT/JP2019/024370, filed Jun. 19, 2019, the entire contents of which are incorporated herein by reference.

TECHNICAL FIELD

The present disclosure relates to an instruction conversion device, a method, and a program.

BACKGROUND ART

Patent Literature 1 describes a measurement control system that enables communications between application software that monitors programmable logic controllers (PLCs) and PLCs on multiple transmission paths complying with different communication protocols. In this measurement control system, the application software that monitors PLCs outputs a communication request specifying a logical address to communication management software to acquire data from the PLCs. The communication management software acquires a type code specifying the type of the transmission path to be connected to a communication target PLC and the address of a device memory of the PLC from a conversion table that stores associations between logical addresses and addresses of device memories of the PLCs, and the logical address specified by the communication request, and requests data on the device memory from the PLC in accordance with the communication protocol for the communication target transmission path. The communication management software receives data from the PLC and provides the received data to the application software.

In the structure described in Patent Literature 1, the communication management software converts the logical address to the type code and the address of the device memory and requests data on the device memory from the PLC in accordance with the communication protocol for the communication target transmission path. Thus, the application software can acquire data from the PLC irrespective of the difference between the communication protocols.

CITATION LIST

Patent Literature

Patent Literature 1: Unexamined Japanese Patent Application Publication No. 2000-341357

SUMMARY OF INVENTION

Technical Problem

In the structure described in Patent Literature 1, the application software can operate the devices on the transmission paths complying with different communication protocols irrespective of the difference between the communication protocols. Thus, developers of the application software are to develop application software compatible with an interface specific to the communication management software.

In response to the above issue, an objective of the present disclosure is to provide application software complying with general communication protocols to manage devices on transmission paths complying with different communication protocols.

Solution to Problem

To achieve the above objective, an instruction conversion device according to an aspect of the present disclosure includes a first bus complying with a first communication protocol, and a second bus complying with a second communication protocol different from the first communication protocol. Conversion instruction storage means included in the instruction conversion device stores information indicating association between a general instruction complying with the first communication protocol and a dedicated instruction complying with the second communication protocol. Instruction conversion means included in the instruction conversion device acquires, when the general instruction is output by instruction output means to a device connected via the second bus, the dedicated instruction associated with the general instruction from the conversion instruction storage means and provides the acquired dedicated instruction to the device via the second bus.

Advantageous Effects of Invention

The instruction conversion device according to the above aspect of the present disclosure acquires, when a general instruction complying with a first communication protocol is output by instruction output means to a device connected via a second bus complying with a second communication protocol, a dedicated instruction associated with the general instruction and complying with the second communication protocol from conversion instruction storage means, and provides the acquired dedicated instruction to the device via the second bus. This structure enables application software complying with general communication protocols to manage devices on transmission paths complying with different communication protocols.

BRIEF DESCRIPTION OF DRAWINGS

FIG. 3 is a table showing an example conversion table in an embodiment;

FIG. 4 is a table showing an example device configuration table in an embodiment;

FIG. 5 is a table showing an example memory mapping table in an embodiment;

FIG. 6 is a table showing an example device configuration table to which a device configuration collector in an embodiment has registered data;

DESCRIPTION OF EMBODIMENTS

An instruction conversion device according to an embodiment of the present disclosure will now be described in detail with reference to the drawings.

Embodiment

In one or more embodiments, a central processing unit (CPU) module 100 in a programmable logic controller functions as an instruction conversion device. The CPU module 100 in a programmable logic controller shown in FIG. 1 executes an instruction of a control program in accordance with an input signal provided from a detector including, for example, a sensor and a switch, and provides an output signal to a control target device.

Figure 2:
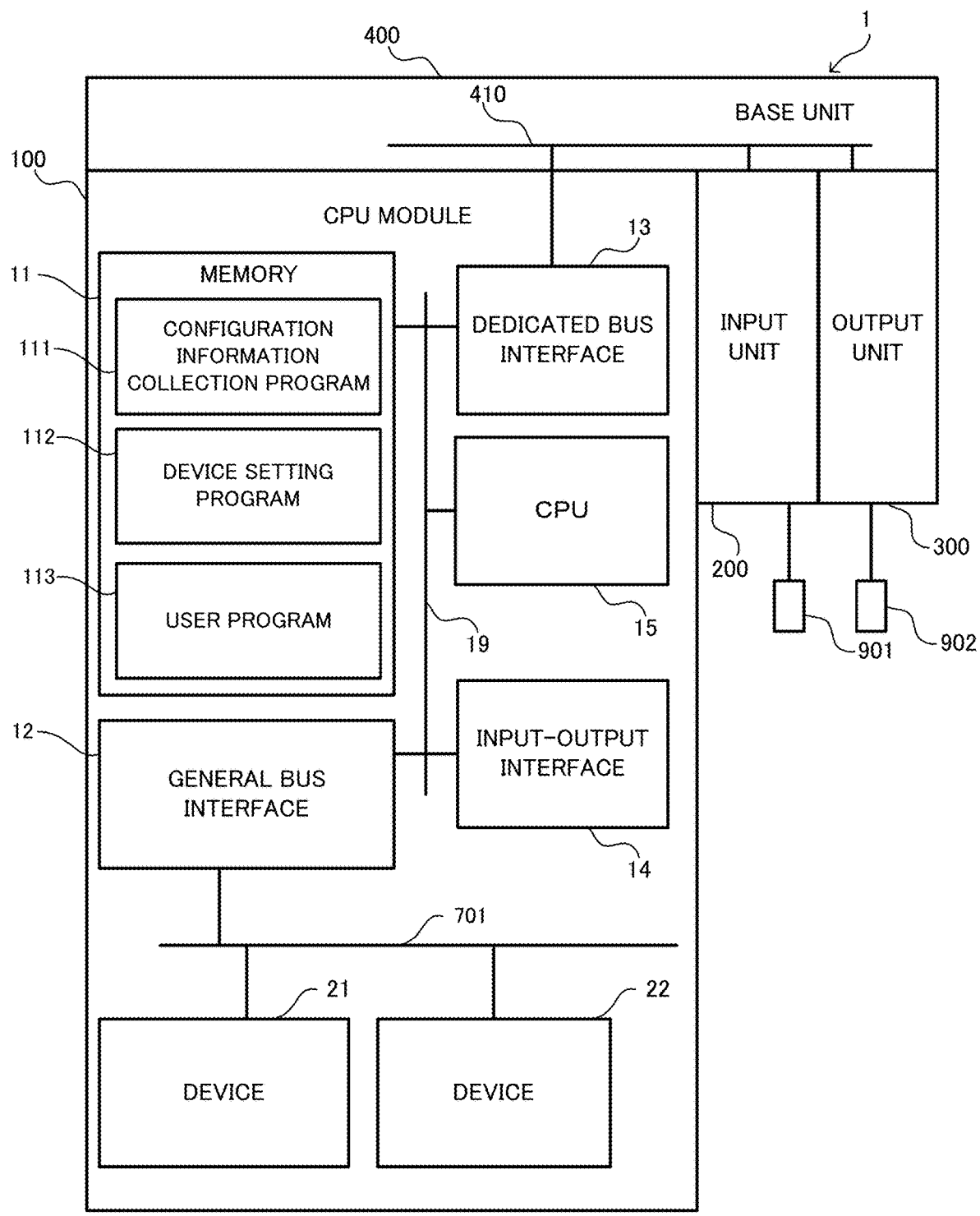
FIG. 2 is a block diagram of a programmable logic controller in an embodiment showing the hardware structure.

As shown in FIG. 2, a programmable logic controller 1 (hereafter, PLC 1) includes the CPU module 100 that controls the entire PLC 1, an input unit 200 that provides an input signal received from a detector 901 to the CPU module 100, an output unit 300 that outputs an output signal indicating an operation result from the CPU module 100 to a control target device 902, and a base unit 400 to which these components are attached. The CPU module 100, the input unit 200, and the output unit 300 are connected to each other via a dedicated bus 410 and can communicate with each other via the dedicated bus 410.

The CPU module 100 executes an instruction of the control program with an input signal provided from the input unit 200 and outputs an output signal to the output unit 300. The detector 901 including, for example, a sensor and a switch is connected to the input unit 200. The input unit 200 provides an input signal provided from the detector 901 to the CPU module 100. The control target device 902 including, for example, an actuator, an electromagnetic valve, and an indicator lamp is connected to the output unit 300. The output unit 300 provides an output signal provided from the CPU module 100 to the control target device 902.

The CPU module 100, the input unit 200, and the output unit 300 are attached to the base unit 400. The CPU module 100, the input unit 200, and the output unit 300 are connected to a power supply (not shown) through the base unit 400 and operate with power provided from the power supply. The CPU module 100 can communicate with the input unit 200 and the output unit 300 via the dedicated bus 410.

A general-purpose operating system (OS) is installed in the CPU module 100. Thus, the CPU module 100 is operable in the same manner as a general-purpose computer. For example, a CPU in the CPU module 100 is connected to devices in the CPU module 100 via a general bus and can control the devices. The CPU module 100 can execute application software (hereafter, application) developed with a general-purpose programming language on a general-purpose OS. The communication protocol for the dedicated bus 410 and the communication protocol for the general bus are different.

In the structure characteristic of the embodiment, the CPU module 100 can handle the input unit 200 and the output unit 300 as devices connected to the general bus in the CPU module. When instructions complying with the communication protocol for the general bus are issued for the input unit 200 and the output unit 300, the CPU module 100 converts the instructions to instructions complying with the communication protocol for the dedicated bus 410 and provides the resulting instructions to the input unit 200 and the output unit 300. Thus, for example, a user of the CPU module 100 can manage the input unit 200 and the output unit 300 in the same manner as for the devices in the CPU module using a tool for managing the devices in the CPU module.

In the example below, the CPU module 100 in an embodiment with a characteristic structure will be mainly described.

The CPU module 100 includes, as its hardware components, a memory 11 that stores various programs and data, a general bus interface 12 for communications with a general bus, a dedicated bus interface 13 for communications with the dedicated bus 410, an input-output interface 14 for connection to peripheral devices, and a CPU 15 that controls the entire CPU module 100. The memory 11, the general bus interface 12, the dedicated bus interface 13, and the input-output interface 14 are connected to the CPU 15 via a CPU bus 19 and communicate with the CPU 15.

The memory 11 includes a volatile memory and a non-volatile memory. The memory 11 stores programs for implementing various functions of the CPU module 100 and data used for executing the programs.

The memory 11 stores a configuration information collection program 111, a device setting program 112, and a user program 113. The configuration information collection program 111 causes the CPU module 100 to collect information about the configuration of the device. The device setting program 112 causes the CPU module 100 to generate information used to handle the functional units as virtual devices on a general bus 701. The user program 113 causes the CPU module 100 to control the control target device 902.

The general bus interface 12 is a connection interface for connecting the CPU 15 and devices 21 and 22 via the general bus 701. The general bus 701 is a local bus connecting the CPU 15 and the devices 21 and 22. The devices 21 and 22 are, for example, a network adapter and a graphic adapter, and are connected to the CPU 15. In the embodiment, the general bus 701 may be a peripheral component interconnect (PCI) bus. The general bus 701 is an example of a first bus of the present disclosure. The communication protocol for the general bus 701 is an example of a first communication protocol in an aspect of the present disclosure.

The dedicated bus interface 13 is a connection interface for connecting the CPU module 100 with the input unit 200 and the output unit 300 via the dedicated bus 410. The input unit 200 and the output unit 300 may hereafter be referred to as functional units. The dedicated bus 410 is a system bus used in the PLC 1 including multiple components for communications between the components, and, for example, is a bus for which a communication protocol is defined for the type of the PLC 1. The dedicated bus 410 is an example of a second bus in an aspect of the present disclosure. The communication protocol of the dedicated bus 410 is an example of a second communication protocol in an aspect of the present disclosure.

The input-output interface 14 includes, for example, a USB controller. The input-output interface 14 connects the CPU 15 and peripheral devices (not shown) via a connection cable (not shown). Examples of the peripheral devices include a keyboard, a mouse, and a display.

The CPU 15 executes various programs stored in the memory 11 to implement various functions of the CPU module 100. For example, the CPU 15 executes the user program 113 stored in the memory 11 to perform a calculation using a value indicated with an input signal provided from a detector and provides an output signal based on a value indicating the calculation result to the control target device 902.

In the embodiment, the CPU 15 executes the configuration information collection program 111 to collect information about the device configuration. The CPU 15 executes the device setting program 112 to generate information used to handle the functional units as virtual devices on the general bus 701.

Figure 1:
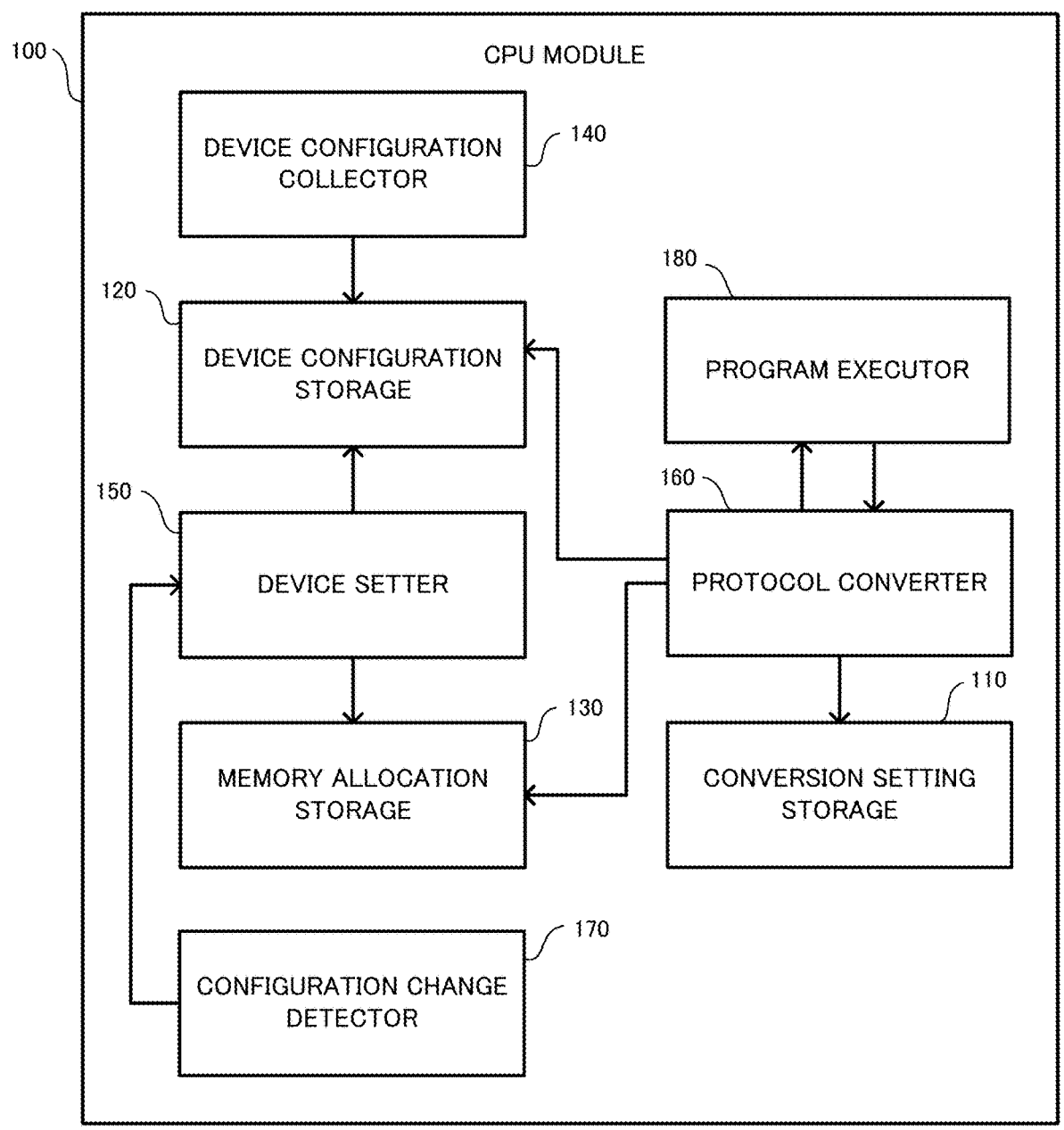
FIG. 1 is a functional block diagram of a central processing unit (CPU) module in a programmable logic controller in an embodiment of the present disclosure.

Referring now to FIG. 1, the functional units of the CPU module 100 will be described. The CPU module 100 includes, as its functional units, a conversion setting storage 110 that stores association of instructions to devices, a device configuration storage 120 that stores device configuration information allocated to each functional unit, a memory allocation storage 130 that stores memory mapping information, a device configuration collector 140 that collects device configuration information, a device setter 150 that allocates required device configuration information to each functional unit, a protocol converter 160 that transmits a dedicated instruction to which a general instruction is converted to each functional unit, and a configuration change detector 170 that detects a change in the device configuration. The device configuration information is used to access each device on the general bus 701.

To control the functional units as virtual devices on the general bus 701, the conversion setting storage 110 stores association between an actual instruction (hereafter, dedicated instruction) provided to the functional units via the dedicated bus 410 and an instruction (hereafter, general instruction) to control the devices connected to the general bus 701. Examples of the general instruction include instructions to the devices such as open, close, read, and write. The functions of the conversion setting storage 110 are implemented by the memory 11 shown in FIG. 2. The conversion setting storage 110 is an example of conversion instruction storage means in an aspect of the present disclosure.

FIG. 3 shows an example conversion table 110a stored in the conversion setting storage 110. The conversion table 110a stores a device name identifying a device, a value indicating the device type, a value indicating a connected bus type to which the device is actually connected, a value indicating the bus width, a dedicated instruction that controls the functional unit, and a general instruction associated with the dedicated instruction. In the illustrated example, the device name is used as a value identifying each device. Instead of the device name, other identification information that enables identification of each device may be used.

For example, when an application of the CPU module 100 outputs general instructions to the functional units, the protocol converter 160 (described later) converts the general instructions to the dedicated instructions and provides the resulting dedicated instructions to the functional units. The application is an example of instruction output means in an aspect of the present disclosure.

The conversion table 110a also includes association of an actual return value when the dedicated instruction is executed on the functional units and an expected return value. An example of the expected return value will now be described. When, for example, the application in the CPU module 100 executes a general instruction on a functional unit, the application may use a return value as an execution result of the instruction. However, the functional unit that has received the dedicated instruction associated with the general instruction may fail to return a return value or may return a value different from the return value expected by the application. An expected return value is preset to accommodate the difference between the specifications of the functional unit and the interface of the application.

In the illustrated example, the device type of the input unit 200 is an input-output (I/O) unit, and the connected bus type is the dedicated bus 410. The bus width of the dedicated bus 410 is 64 bits. A general instruction A provided to the input unit 200 is converted to a dedicated instruction A. For example, when the application outputs the general instruction A to the input unit 200, the protocol converter 160 (described later) provides a dedicated instruction A associated with the general instruction A to the input unit 200. Upon receiving the dedicated instruction A, the input unit 200 returns no value as a return value. Thus, an expected return value is defined. When the application executes the general instruction A on the input unit 200, the expected return value is returned to the application.

The conversion table 110a also stores data on devices actually placed on the general bus 701. The devices actually placed on the general bus 701 are controllable by general instructions. As illustrated, for the devices actually placed on the general bus 701, no values are set in the dedicated instruction, the general instruction, the actual return value, and the expected return value.

The conversion table 110a is created by a user in advance. The user is, for example, a manager of the CPU module 100. For example, the user creates the conversion table 110a shown in FIG. 3 based on a document defining communication protocols for the general bus 701 and a document defining communication protocols for the dedicated bus 410.

The device configuration storage 120 shown in FIG. 1 stores device configuration information allocated to the functional units to handle the functional units as virtual devices on the general bus 701. The device configuration information is used by the CPU 15 to access the devices on the general bus 701. For example, the device configuration information includes association information between the memory addresses in the dedicated bus 410 designated to access the functional units via the dedicated bus 410 and the memory addresses allocated to the address space in the general bus 701. The functions of the device configuration storage 120 are implemented by the memory 11 shown in FIG. 2. The device configuration storage 120 is an example of device configuration storage means in an aspect of the present disclosure.

FIG. 4 shows an example device configuration table 120a stored in the device configuration storage 120. The device configuration table 120a stores, as device configuration information, a device name identifying a device, a value indicating the device type, a value indicating a bus type to which the corresponding device is actually connected, a memory address in the address space in the PCI, position information indicating the connection position of the device on the general bus 701, and a physical address allocated to a device register used to access the device. The position information includes a bus number identifying each bus, a device number specifying the position of the device on the corresponding bus, and a function number specifying the function provided by the device. The CPU 15 writes an instruction into the device register allocated to a device to execute the instruction on the device.

The functional units are not connected to the general bus 701, and thus arbitrary values are allocated to the memory address in the address space of the PCI, the position information, and the physical address of the device register for each functional unit. These values for the functional units are allocated in the initial processing of the CPU module 100.

The device configuration table 120a also stores data on the devices connected to the general bus 701.

The memory allocation storage 130 shown in FIG. 1 stores memory mapping information to handle the functional units as virtual devices on the general bus 701. The memory mapping information indicates association between the memory address in the address space of the PCI and an actual address designated to access each functional unit via the dedicated bus 410. The functions of the memory allocation storage 130 are implemented by the memory 11 shown in FIG. 2. The memory allocation storage 130 is an example of memory allocation storage means in an aspect of the present disclosure.

FIG. 5 shows an example memory mapping table 130a stored in the memory allocation storage 130. The memory mapping table 130a stores a device name identifying a device, an actual start address indicating an actual memory address in the address space of the dedicated bus 410, an actual size indicating a memory size in the address space of the dedicated bus 410, a memory address in the address space of the PCI allocated to handle each functional unit as a virtual device on the general bus 701, and a value indicating the bus type to which the functional unit is actually connected. The memory address identified by the actual start address and the actual size is an example of the dedicated memory address in an aspect of the present disclosure. The memory address in the address space of the PCI is an example of a general memory address in an aspect of the present disclosure.

The memory mapping table 130a does not store data on the devices actually located on the general bus 701.

The device configuration collector 140 shown in FIG. 1 collects the device configuration information. The device configuration collector 140 first collects the device configuration information about the devices on the general bus 701 and stores the collected device configuration information into the device configuration table 120a. The device configuration collector 140 also collects the device configuration information about devices on another bus connected to the CPU module 100 and stores the collected device configuration information into the device configuration table 120a.

The device configuration collector 140 cannot collect all the device configuration information about the devices other than the devices on the general bus 701. Thus, the device configuration collector 140 stores the collectable information alone into the device configuration table 120a. Thus, as shown in FIG. 6, the device configuration table 120a does not store, for the functional units or the devices on the dedicated bus 410, the memory address in the address space of the PCI, the position information indicating the physical position of the device on the general bus 701, and the physical address allocated to the device register. The above information is stored into the device configuration table 120a by the device setter 150 (described later).

The device configuration collector 140 collects device configuration information as part of initial processing performed by the CPU module 100 after the power is turned on. The functions of the device configuration collector 140 are implemented by the CPU 15 shown in FIG. 2 executing the configuration information collection program 111. The device configuration collector 140 is an example of device configuration collection means in an aspect of the present disclosure.

The device setter 150 shown in FIG. 1 calculates information used to handle the functional units or devices not connected to the general bus 701 as virtual devices on the general bus 701 and stores the calculated information into the device configuration table 120a and the memory mapping table 130a. As described above, the device configuration collector 140 cannot collect device configuration information for all the functional units. The device setter 150 registers device configuration information uncollectable by the device configuration collector 140 into the device configuration table 120a.

Specific information registered by the device setter 150 into the device configuration table 120a will now be described. As shown in FIG. 6, the device configuration collector 140 cannot collect the memory address in the address space of the PCI, the position information, and the physical address of the device register for the functional units or the devices on the dedicated bus 410. Thus, the device setter 150 allocates the memory address in the address space of the PCI, the position information, and the physical address of the device register to each of the functional units, and registers the allocated values of the memory address, position information, and the physical address of the device register into the device configuration table 120a.

The device setter 150 allocates the memory address unused in the address space of the PCI to the functional unit. The device setter 150 determines, based on the actual start address and the actual size of the functional unit connected to the dedicated bus 410, the memory area in the address space of the PCI to be allocated to the functional unit. The device setter 150 includes means for acquiring the actual start address and the actual size of the functional unit connected to the dedicated bus 410.

The device setter 150 assumes that each functional unit is virtually connected to a position on the general bus 701 to which no device is connected and allocates the position to the functional unit.

The device setter 150 reserves the memory area unused as the device register of the device on the general bus 701 as a device register allocated to the functional unit.

The specific information registered by the device setter 150 into the memory mapping table 130a will now be described. The device setter 150 associates the memory address in the address space of the PCI allocated to the functional unit, the actual start address or the memory address in the address space of the dedicated bus 410, and the actual size or the memory size in the address space of the dedicated bus 410 with one another, and stores the associated information into the memory mapping table 130a.

As part of initial processing performed by the CPU module 100 after the power is turned on, the device setter 150 calculates information used to handle the functional units as devices on the general bus 701 and stores the calculated information into the device configuration table 120a and the memory mapping table 130a.

The device setter 150 updates the device configuration table 120a and the memory mapping table 130a when the configuration change detector 170 (described later) detects a change in the device configuration. After updating the device configuration table 120a and the memory mapping table 130a, for example, the device setter 150 reboots the CPU module 100 to reflect the latest information about the CPU module 100. The functions of the device setter 150 are implemented by the CPU 15 shown in FIG. 2 executing the device setting program 112. The device setter 150 is an example of device setting means in an aspect of the present disclosure.

The protocol converter 160 shown in FIG. 1 converts general instructions provided to the functional units to dedicated instructions.

For example, the application of the CPU module 100 writes a determined value into the device register allocated to a functional unit to output a general instruction to the functional unit. When the value is written into the device register, the protocol converter 160 acquires, from the device configuration table 120a shown in FIG. 4, the device name, the device type, and the connected bus type of the device to which the device register with the value written is allocated. The protocol converter 160 reads data registered for the identified device from the conversion table 110a shown in FIG. 3. The protocol converter 160 acquires the dedicated instruction associated with the general instruction output by the application from the read data.

When the dedicated instruction associated with the designated general instruction is not registered into the conversion table 110a, the protocol converter 160 returns an error to the application that has requested the instruction.

The protocol converter 160 acquires the actual start address and the actual size of the functional unit or the corresponding device from the memory mapping table 130a, specifies the actual start address and the actual size, and transmits the dedicated instruction read from the conversion table 110a to the corresponding functional unit in accordance with the communication protocol for the dedicated bus 410. Thus, the protocol converter 160 converts the general instruction output by the CPU module 100 to the functional unit to the dedicated instruction and executes the resulting dedicated instruction on the functional unit.

Upon receiving the return value from the functional unit via the dedicated bus 410, the protocol converter 160 acquires the expected return value from the conversion table 110a. The protocol converter 160 writes the acquired return value into the area specified by the memory address in the address space of the PCI defined in the device configuration table 120a. Thus, the protocol converter 160 converts the return value from the functional unit and returns the expected return value to the application. The functions of the protocol converter 160 are implemented by the CPU 15 shown in FIG. 2. For example, the OS of the CPU module 100 in an embodiment includes the functions of the protocol converter 160 and implements the functions of the protocol converter 160 in interpreting the instruction. The protocol converter 160 is an example of instruction conversion means in an aspect of the present disclosure.

The configuration change detector 170 shown in FIG. 1 detects a change in the device configuration. For example, the configuration change detector 170 is capable of detecting an electric signal resulting from a connection of a new device to the CPU module 100 and determines a change in the device configuration upon detecting a connection of a new device. In some embodiments, the configuration change detector 170 is capable of detecting mapping and unmapping of the memory area and determines a change in the device configuration upon detecting mapping and unmapping of the memory area. Upon detecting a change in the device configuration, the configuration change detector 170 instructs the device setter 150 to update the device configuration table 120a and the memory mapping table 130a. The functions of the configuration change detector 170 are implemented by the CPU 15 shown in FIG. 2.

A program executor 180 shown in FIG. 1 executes the user program 113. The functions of the program executor 180 are implemented by the CPU 15 shown in FIG. 2.

The initial setting process in which the CPU module 100 with the above structure creates the device configuration table 120a and the memory mapping table 130a will now be described. The initial setting process is performed as part of the initial processing performed when the CPU module 100 is turned on.

The CPU 15 in the CPU module 100 shown in FIG. 2 executes the configuration information collection program 111 to function as the device configuration collector 140 shown in FIG. 1 and executes the device setting program 112 shown in FIG. 2 to function as the device setter 150 shown in FIG. 1.

Figure 7:
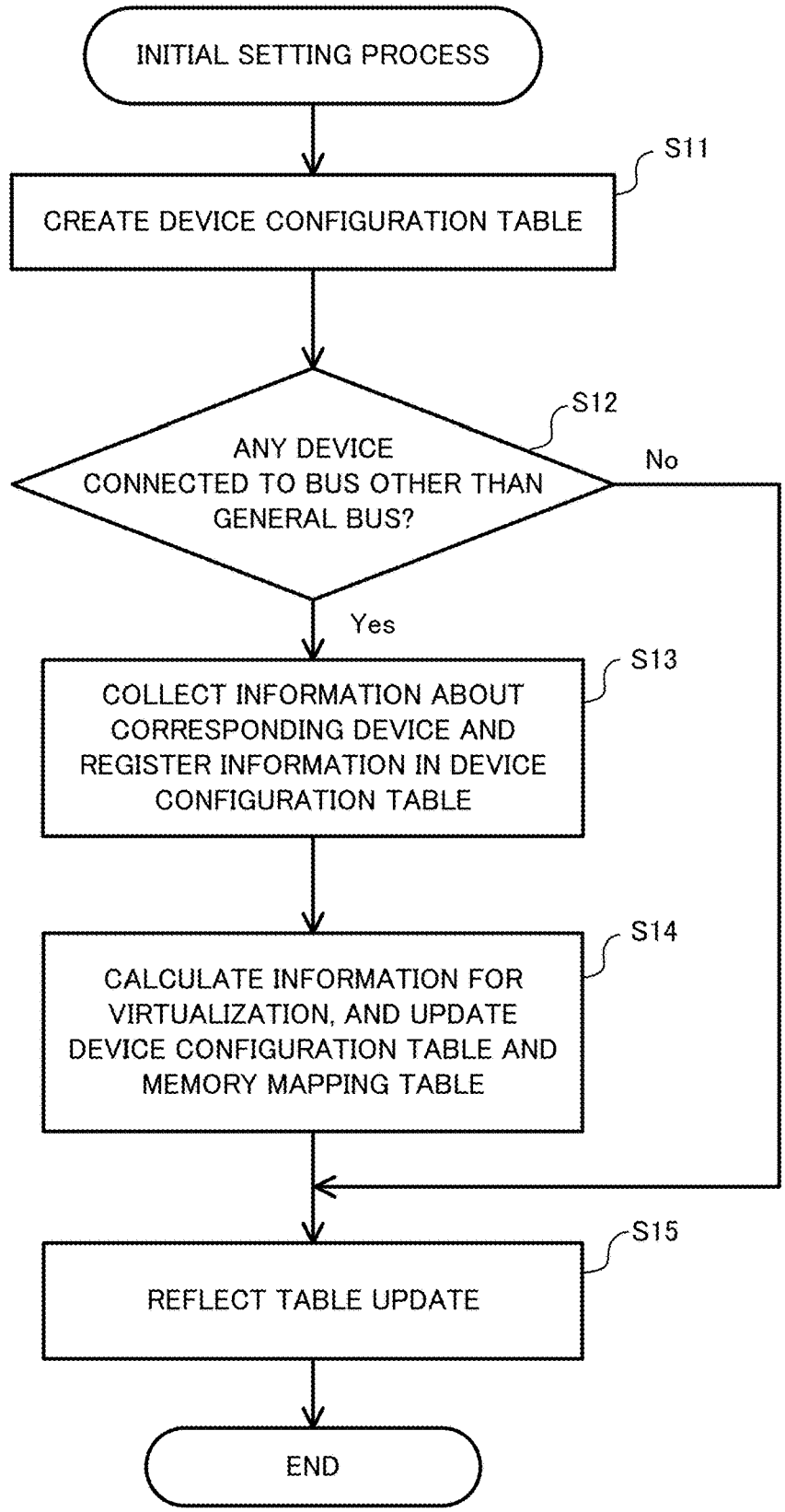
FIG. 7 is a flowchart of an initial setting process in an embodiment.

As shown in FIG. 7, the device configuration collector 140 first collects information about the device configuration actually connected to the general bus 701 and creates the device configuration table 120a storing the collected data (step S11). The device configuration collector 140 collects the device name, the device type, and the connected bus type of the devices 21 and 22, the memory address in the address space of the PCI, the position information, and the physical address of the device register, and creates the device configuration table 120a storing the collected data.

Subsequently, the device configuration collector 140 determines whether any device is connected to a bus other than the general bus 701 (step S12). Upon determining that at least one device is connected to a bus other than the general bus 701 (Yes in step S12), the device configuration collector 140 collects information about the device on the bus other than the general bus 701 and registers the collected information into the device configuration table 120a (step S13).

In the example shown in FIG. 2, the input unit 200 and the output unit 300 are connected to the CPU module 100. Thus, the device configuration collector 140 collects the device name, the device type, and the connected bus type for each of the input unit 200 and the output unit 300, and registers the collected data into the device configuration table 120a as shown in FIG. 6. The input unit 200 and the output unit 300 are not connected to the devices on the general bus 701, and thus the memory address, the connection portion, and the value of the device register for the input unit 200 and the output unit 300 are not registered into the device configuration table 120a.

Subsequently, the device setter 150 calculates information used to handle the functional units as virtual devices on the general bus 701 and updates the device configuration table 120a and the memory mapping table 130a (step S14). More specifically, the device setter 150 calculates information not included in the device configuration table 120a shown in FIG. 6 and used to handle the functional units as devices on the general bus 701 and registers the calculated information into the device configuration table 120a. The device setter 150 also calculates information to be registered into the memory mapping table 130a and registers the calculated information into the memory mapping table 130a. The device setter 150 then reflects the table update on the CPU module 100 (step S15). For example, the device setter 150 reboots the CPU module 100 and reflects the table update on the CPU module. The initial setting process is performed in the above manner.

The instruction conversion process in which the CPU module 100 converts the general instruction to a dedicated instruction to control the functional unit with the general instruction will now be described. For example, the instruction conversion process is performed when the user program 113 is activated.

Figure 8:
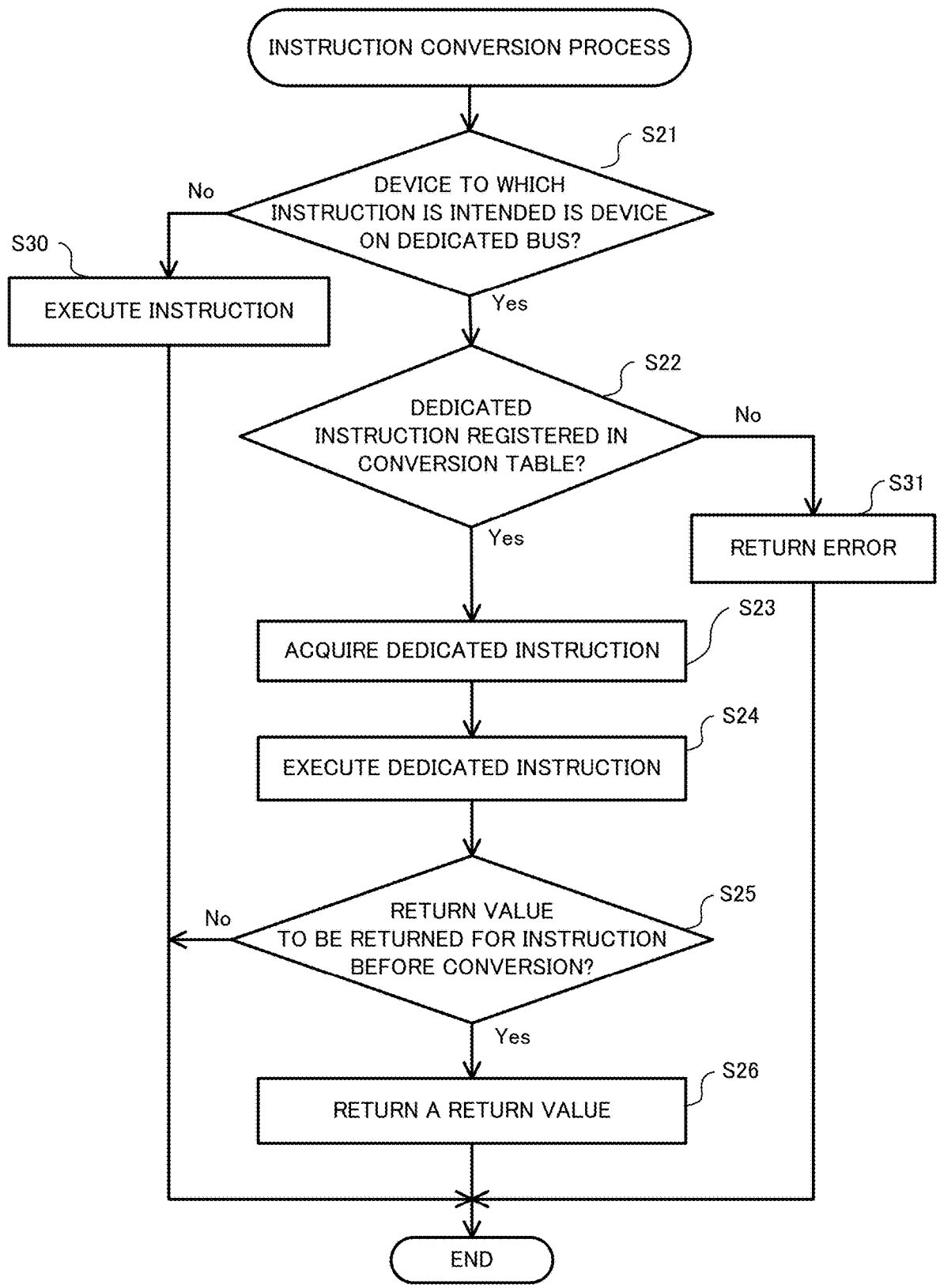
FIG. 8 is a flowchart of an instruction conversion process in an embodiment.

The CPU 15 in the CPU module 100 shown in FIG. 2 functions as the protocol converter 160 shown in FIG. 1 and executes the instruction conversion process shown in FIG. 8. The protocol converter 160 converts the general instructions as appropriate as the program executor 180 sequentially processes the instructions of the user program 113.

The protocol converter 160 determines whether a device to which the general instruction is intended is a device on the dedicated bus 410 in accordance with the value of the connected bus type in the conversion table 110a (step S21).

Upon determining that the device to which the general instruction is intended is a device on the dedicated bus 410 (Yes in step S21), the protocol converter 160 determines whether the dedicated instruction associated with the general instruction is registered in the conversion table 110a (step S22). When the dedicated instruction is not registered in the conversion table 110a (No in step S22), the protocol converter 160 returns an error to the sender of the instruction (step S31) and ends the instruction conversion process.

When the dedicated instruction associated with the general instruction is registered in the conversion table 110a (Yes in step S22), the protocol converter 160 acquires the dedicated instruction associated with the general instruction (step S23). A memory address specifying a memory area may be added to the general instruction. The specified memory address is a memory address in the address space of the PCI. Thus, the protocol converter 160 acquires the actual start address and the actual size corresponding to the specified memory address in the address space of the PCI from the memory mapping table 130a shown in FIG. 5.

The protocol converter 160 executes a dedicated instruction (step S24). More specifically, the protocol converter 160 transmits the dedicated instruction to the corresponding functional unit via the dedicated bus 410. When the memory area is specified by the general instruction, the protocol converter 160 specifies the actual start address and the actual size acquired in step S23 and executes the dedicated instruction. Upon determining that a return value is to be returned from the conversion table 110a (Yes in step S25), the protocol converter 160 acquires, for example, a return value contained in response data returned from the functional unit, acquires the expected return value corresponding to the acquired return value from the conversion table 110a, and returns the expected return value to the sender of the instruction (step S26).

When, in step S21, the protocol converter 160 determines that the device to which the general instruction is intended is not the device on the dedicated bus 410 (No in step S21), the program executor 180 normally processes the general instruction (step S30). The instruction conversion process is performed in the above manner.

As described above, the CPU module 100 in an embodiment includes a mechanism for converting a general instruction to a dedicated instruction for a device on the dedicated bus 410, and thus can seamlessly control the devices on transmission paths complying with different communication protocols.

The control programs for the PLC are frequently created with languages such as a ladder diagram or a sequential function chart. For those who have no knowledge of such languages frequently used for programming of the PLC, the control programs for the PLC are difficult to develop. The configuration according to an embodiment enables control of the PLC with general instructions and enables development of control programs for the PLC with, for example, a general-purpose programming language used in a computer in which a general-purpose OS is installed.

The CPU module 100 internally converts a general instruction to a dedicated instruction. This structure eliminates, for example, detailed programming by a user such as association of memories in the address space of the PCI.

The functional units are handled as devices on the general bus 701 in the CPU module 100. Thus, similarly to the devices in the CPU module 100, a user can manage, for example, the functional units such as the input unit 200 and the output unit 300 with a tool for managing the devices in the CPU module. As information indicating the positions of the functional units handled as the devices on the general bus 701, position information in the device configuration table 120a shown in FIG. 4 is displayed. As the resource information about the functional units, the physical addresses of the device registers in the device configuration table 120a are displayed.

In the embodiment described above, general instructions output to the devices on the dedicated bus 410 are successively converted to dedicated instructions while the user program 113 is being executed. However, the embodiment is not limited to this example. For example, after storing data to be included into the device configuration table 120a and the memory mapping table 130a in the initial processing, the CPU module 100 may generate a program including the general instructions for functional devices in the user program 113 replaced with dedicated instructions, and execute the program with the replaced instructions instead of the user program 113.

In the embodiment described above, a bus including a PCI is used as a general bus. However, the embodiment is not limited to this example. For example, instead of the general bus 701 in an embodiment shown in FIG. 2, a bus 420 different from the dedicated bus 410 may be used. In this structure, the devices on the dedicated bus 410 are handled as virtual buses on the bus 420, and thus the effects similar to the effects in the embodiment can be expected.

In the embodiment described above, the CPU module 100 functions as a bus conversion controller. However, the embodiment is not limited to this example. For example, information processor connected to the PLC may operate as a bus conversion controller. In this case, the CPU module 100 and the functional unit correspond to devices in an aspect of the present disclosure, and the information processor may convert the general instructions output to the CPU module and the functional unit to dedicated instructions.

Examples of non-transitory recording media that record the above programs include computer-readable non-transitory recording media including a magnetic disk, an optical disk, an magneto-optical disk, a flash memory, a semiconductor memory, and a magnetic tape.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Programmable logic controller (PLC)
11 Memory
12 General bus interface
13 Dedicated bus interface
14 Input-output interface
15 CPU
19 CPU bus
21, 22 Device
100 CPU module
110 Conversion setting storage
110a Conversion table
111 Configuration information collection program 112 Device setting program
113 User program
120 Device configuration storage
120a Device configuration table
130 Memory allocation storage
130a Memory mapping table
140 Device configuration collector
150 Device setter
160 Protocol converter
170 Configuration change detector
180 Program executor
200 Input unit
300 Output unit
400 Base unit
410 Dedicated bus
701 General bus
901 Detector
902 Control target device

The invention claimed is:

1. An instruction conversion device comprising:
a first bus complying with a first communication protocol;
a second bus complying with a second communication protocol different from the first communication protocol;
a conversion instruction storage to store information indicating association between a general instruction complying with the first communication protocol and a dedicated instruction complying with the second communication protocol; and
an instruction converter to acquire, when the general instruction is output by an instruction outputter to a device other than the instruction conversion device and connected via the second bus, the dedicated instruction associated with the general instruction from the conversion instruction storage and provide the acquired dedicated instruction to the device via the second bus, wherein
the first bus is a local bus connecting a central processing unit included in the instruction conversion device to an internal device included in the instruction conversion device, and
the second bus is a bus connecting the central processing unit included in the instruction conversion device to the device, and
the instruction conversion device further comprises a device configuration storage to store device configuration information necessary for handling the device as a virtual device on the first bus.

2. The instruction conversion device according to claim 1, wherein the device configuration information includes a memory address allocated to the device in an address space of the first bus position information indicating a virtual connection position of the device on the first bus, and an address of a device register to be used to execute an instruction on the device on the first bus, and
when a value is written into the device register allocated to the device, the instruction converter acquires the dedicated instruction associated with the general instruction specified with the written value from the conversion instruction storage.

3. The instruction conversion device according to claim 2, further comprising:
a memory allocation storage to store association between a dedicated memory address in an address space of the second bus and a general memory address allocated to the device in the address space of the first bus,
wherein the instruction converter acquires the dedicated memory address associated with the general memory address specified together with the general instruction from the memory allocation storage, and specifies the acquired dedicated memory address to provide the dedicated instruction associated with the general instruction to the device.

4. The instruction conversion device according to claim 3, further comprising:
a device configuration collector to collect the device configuration information and store the collected device configuration information into the device configuration storage; and
a device setter to generate information uncollectable by the device configuration collector and store the generated information into the device configuration storage.

5. The instruction conversion device according to claim 4, wherein
the device setter allocates the general memory address in the address space of the first bus to the device, and stores, into the memory allocation storage, the general memory address in association with the dedicated memory address of the device in the address space of the second bus.

6. The instruction conversion device according to claim 1, wherein
the instruction conversion device is a central processing unit module in a programmable logic controller.

7. The instruction conversion device according to claim 6, wherein
the device includes a functional unit in the programmable logic controller.

8. The instruction conversion device according to claim 1, wherein
the device includes a functional unit and a central processing unit module in a programmable logic controller.

9. A method implementable by a computer including a first bus complying with a first communication protocol and a second bus complying with a second communication protocol different from the first communication protocol, the method comprising:
acquiring, when a general instruction complying with the first communication protocol is output by an instruction outputter to a device other than the computer and connected via the second bus, a dedicated instruction complying with the second communication protocol and associated with the general instruction; and
providing the acquired dedicated instruction to the device via the second bus, wherein
the first bus is a local bus connecting a central processing unit included in the computer to an internal device included in the computer, and
the second bus is a bus connecting the central processing unit included in the computer to the device, and
the method further comprising storing device configuration information necessary for handling the device as a virtual device on the first bus.

10. A non-transitory computer-readable recording medium storing a program, the program causing a computer including a first bus complying with a first communication protocol and a second bus complying with a second communication protocol different from the first communication protocol to perform operations comprising:
acquiring, when a general instruction complying with the first communication protocol is output by an instruction outputter to a device other than the computer connected via the second bus, a dedicated instruction complying with the second communication protocol and associated with the general instruction; and providing the acquired dedicated instruction to the device via the second bus, wherein the first bus is a local bus connecting a central processing unit included in the computer to an internal device included in the computer, and the second bus is a bus connecting the central processing unit included in the computer to the device, and the operations further comprising storing device configuration information necessary for handling the device as a virtual device on the first bus.

\* \* \* \* \*